O. S. KNUDSON.
HARVESTER.
No. 185,243. Patented Dec. 12, 1876.
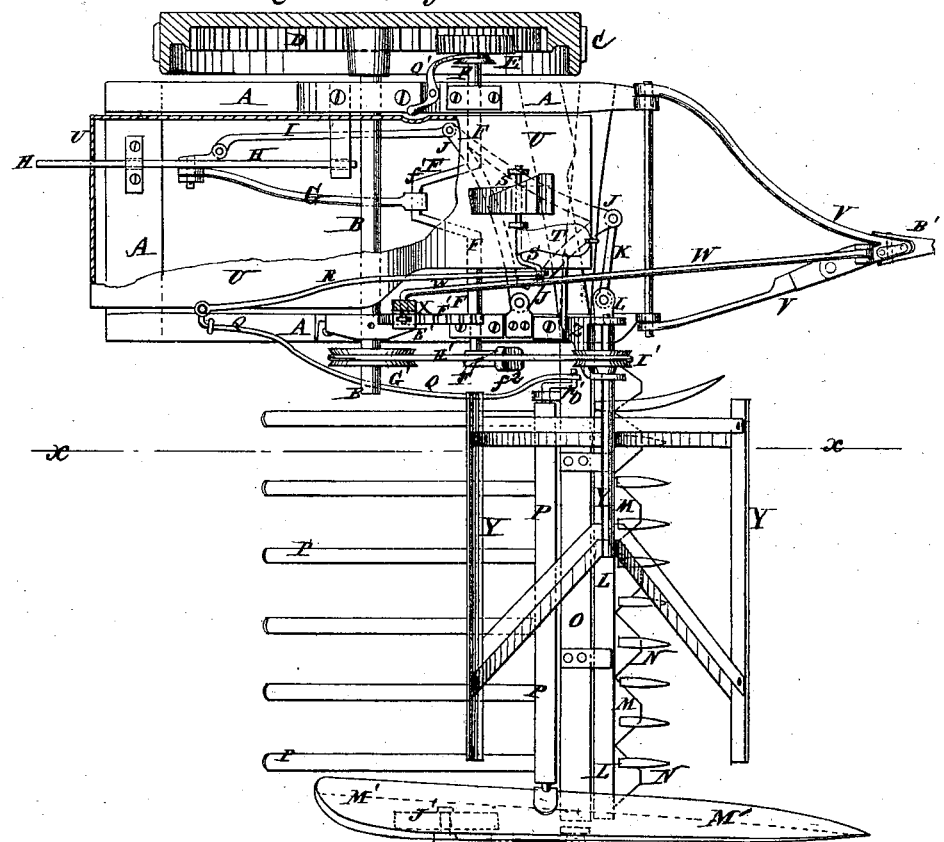
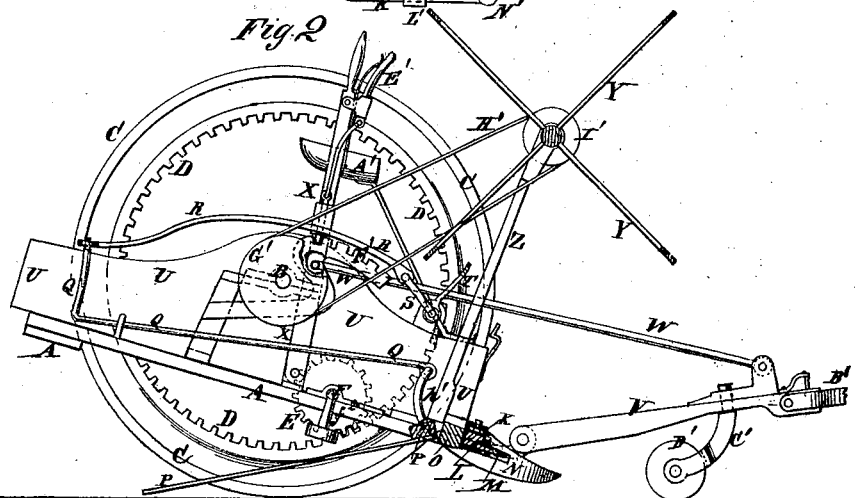
WITNESSES: INVENTOR:

UNITED STATES PATENT OFFICE.

OLE S. KNUDSON, OF HOUSTON, MINNESOTA.

IMPROVEMENT IN HARVESTERS.

Specification forming part of Letters Patent No. 185,243, dated December 12, 1876; application filed July 15, 1876.

*To all whom it may concern:*

Be it known that I, OLE S. KNUDSON, of Houston, in the county of Houston and State of Minnesota, have invented a new and useful Improvement in Reapers and Mowers, of which the following is a specification:

Figure 1 is a top view of my improved machine, part being broken away to show the construction. Fig. 2 is a vertical section of the same taken through the line $x\ x$, Fig. 1.

Similar letters of reference indicate corresponding parts.

The object of this invention is to furnish an improved machine which shall be so constructed that it may be run at less speed than the ordinary machines, and may thus be more durable and of lighter draft, while doing good work.

The invention will first be described in connection with the drawing, and then pointed out in the claim.

A is the frame of the machine, in bearings attached to which revolves the axle B. To the outer end of the axle B is attached the drive-wheel C, which has an internally-toothed gear-wheel, D, formed upon or attached to its inner side. Into the teeth of the gear-wheel D mesh the teeth of the small gear-wheel E, placed upon the outer end of the shaft F, which revolves in bearings attached to the frame A, has a crank, $f^1$, formed upon its middle part, and a weighted arm, $f^2$, attached to its inner end. The crank $f^1$ and the weighted arm $f^2$ project in opposite directions to balance each other. To the crank $f^1$ is pivoted the forward end of a connecting-rod, G, the other end of which is pivoted to the side of a bar, H, that slides in bearings attached to the frame A, and to the other side of said bar is pivoted the rear end of a connecting-rod, I. The forward end of the connecting-rod I is pivoted to the end of the long arm of a bent or elbow lever, J, which is pivoted at its angle to the frame A, and is strengthened by a brace-bar connecting its ends and making it a triangular lever. To the end of the short arm of the bent lever J is pivoted the end of a short connecting-rod, K, the other end of which is pivoted to the end of the sickle-bar L. The crank $f^1$ and the arms of the lever J are made of such a relative length that the sickles M, attached to the sickle-bar L, may move through the space of, and cut the grain against, two of the fingers N, attached to the cutter-bar O. The fingers N incline downward a little, so that when the cutter-bar O is tilted to cut lodged grain, the said fingers may hold the stalks until they are cut. To the rear side of the cutter-bar O is hinged the shaft of the dropper P, to the inner end of which is attached a short crank, $p'$. To the crank $p'$ is pivoted the forward end of a connecting-rod, Q, that passes back through guides attached to the frame A, and its rear end is bent upward, and is pivoted to the rear end of a connecting-rod, R, the forward end of which is pivoted to the crank S of the foot-lever T. The foot-lever S T is pivoted to the case U that covers and protects the working-mechanism of the machine, in such a position that it may be conveniently reached and operated by the driver from his seat A'. To the forward end of the frame A is hinged a triangular frame, V, to the forward angle of which is hinged the tongue B'. To the forward angle of the frame V is pivoted the standard C' of the caster-wheel D', by which the said frame V and tongue B' are supported. To the forward end of the triangular frame V is pivoted the forward end of the connecting-rod W, the rear end of which is pivoted to the lever X. The lower end of the lever X is pivoted to the frame A, and with said lever is connected a lever spring-pawl, E', engaging with the teeth of a curved toothed bar, F', along which said lever X moves. To the inner end of the axle B is attached a pulley, G, around which passes a band, H', which also passes around a pulley, I', attached to the shaft of the reel Y. The shaft of the reel Y revolves in bearings in the upper end of the post Z, the lower end of which is attached to the frame A. The outer end of the cutter-bar O is supported by a wheel, J', the standard K' of which passes through a keeper, L', attached to the divider M', and its end is pivoted to a bar, N', that slides up and down in a groove in said divider, and is secured in place, when adjusted, by a screw or bolt. The gear-wheel E slides upon the shaft F, is made to carry said shaft with it by a pin and notch, and is thrown into and out of gear with the said pin by means of a lever, O', the forked lower end of which rides in a groove in the hub of the said wheel E. The lever O' is pivoted to the frame A, and its upper end projects into such a position that it may be conveniently reached and operated by the driver from his seat.

Having thus described my invention, I claim as new and desire to secure by Letters Patent—

The combination of the gear-wheels D E, the balanced crank-shaft F, the slide H, the triangular lever J, and the connecting-rods G I K with the drive-wheel C, the frame A, and the sickle-bar L, substantially as herein shown and described.

OLE S. KNUDSON.

Witnesses:
F. N. GOODRICH,
E. J. GOODRICH.